United States Patent
Conley, Jr. et al.

[15] 3,684,960
[45] Aug. 15, 1972

[54] PROBE AND GUIDE ASSEMBLY FOR TESTING PRINTED CIRCUIT CARDS

[72] Inventors: William J. Conley, Jr., Boca Raton, Fla.; Clifford G. Ingram, Endwell, N.Y.

[73] Assignee: International Business Machines Corporation, Armonk, N.Y.

[22] Filed: May 15, 1969

[21] Appl. No.: 824,818

[52] U.S. Cl. ........... 324/158 F, 324/72.5, 324/73 PC, 324/158 P
[51] Int. Cl. ..................... G01r 31/22, G01r 15/12
[58] Field of Search ...... 324/158 F, 158 P, 158, 72.5, 324/149, 73, 73 PC; 317/101 C, 101 CC; 200/5 R, 16 R, 46; 340/149; 235/61.11

[56] References Cited

UNITED STATES PATENTS

| | | |
|---|---|---|
| 2,918,648 | 12/1959 | Ludman et al............324/158 |
| 2,968,019 | 1/1961 | Steinman et al...........324/158 |
| 3,146,320 | 8/1964 | Wang et al...............200/16 X |
| 3,445,770 | 5/1969 | Harmon.....................324/158 |

Primary Examiner—Rudolph V. Rolinec
Assistant Examiner—Ernest F. Karlsen
Attorney—Hanifin and Jancin and Charles S. Neave

[57] ABSTRACT

A test probe adapter comprising a template having a plurality of holes conforming to the circuit pattern of a printed circuit card and a channel guide member designed to be detachably mounted to a printed circuit card. A probe arm and contact assembly is slidably inserted into the channel guide to a predetermined position where the contact tip will drop through a hole in the template and into a wiping contact with a predetermined circuit whereby an electrical connection will be made. A lead wire attached to the probe arm and contact assembly connects with the test equipment to enable the dynamic testing of a printed circuit board.

2 Claims, 4 Drawing Figures

PATENTED AUG 15 1972 3,684,960

INVENTORS
WILLIAM J. CONLEY, JR.
CLIFFORD G. INGRAM

BY
AGENT

016
PROBE AND GUIDE ASSEMBLY FOR TESTING PRINTED CIRCUIT CARDS

BACKGROUND OF THE INVENTION

1. Field of the Invention

This invention relates to test adapters for printed circuit cards, and more particularly to adapters which enable the dynamic testing of printed circuit cards while residing within the normal operating position in a data processing system.

2. Description of the Prior Art

In the manufacture of electronic equipment for use in data processing systems, the necessity and emphasis for compactness has resulted in the loss of adequate space within the supporting frames in which the proper testing of the components of the circuitry included therein can be accommodated. The advantages of testing circuits and components in their dynamic states and while being subjected to every parametric value encountered in the usage of such equipment have been sacrificed to the advantages of compactness. Optimum operational characteristics of such equipment are being increasingly jeopardized by such lack of dynamic testing.

SUMMARY OF THE INVENTION

This invention provides an appropriate solution to the above-noted problems by means of an adapter for the dynamic testing of printed circuit cards and comprising a template having a plurality of predetermined hole positions conforming to the circuit pattern of a printed circuit card, a channel guide member, and a probe arm and contacting assembly slidably positionable within the channel guide member for making connection through holes in the template with preselected circuits of the printed circuit card. The adapter of this invention is dimensioned so that it can be affixed to the printed card while the card remains connected in its normal socket thereby permitting the testing of the circuitry in its normal operating environment.

It is an object of this invention to provide an adapter whereby circuits and components can be tested dynamically.

Another object of this invention is to provide for the testing of electronic equipment in which compactness is a foremost consideration.

Still another object of this invention is to provide for both maximum compactness and maximum dynamic testing capabilities within electronic equipment.

A further object of this invention is to provide ready access to an operating electronic circuit and its components in their normal operating position and to enable careful inspection and testing.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
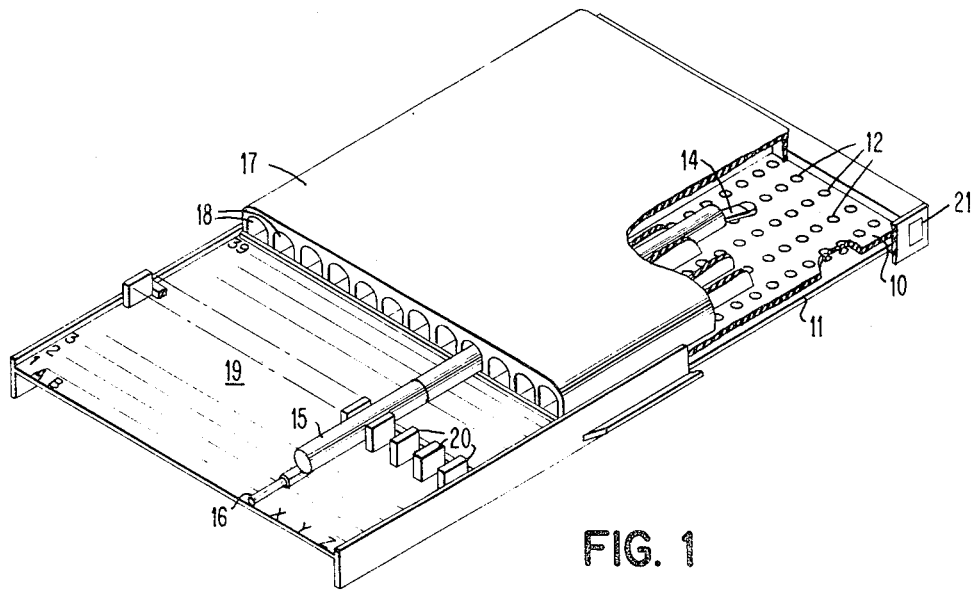
FIG. 1 is an isometric view of a probe and test guide assembly with a partial fragmentary showing the probe arm and contacting member in accordance with the preferred embodiment of the invention.
Figure 2:
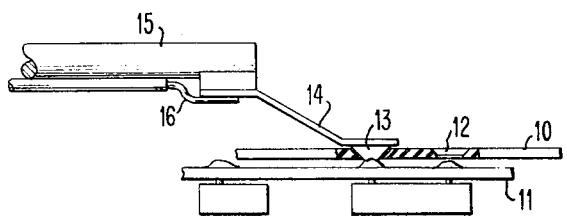
FIG. 2 is a view showing the probe arm and contact assembly.
Figure 3:
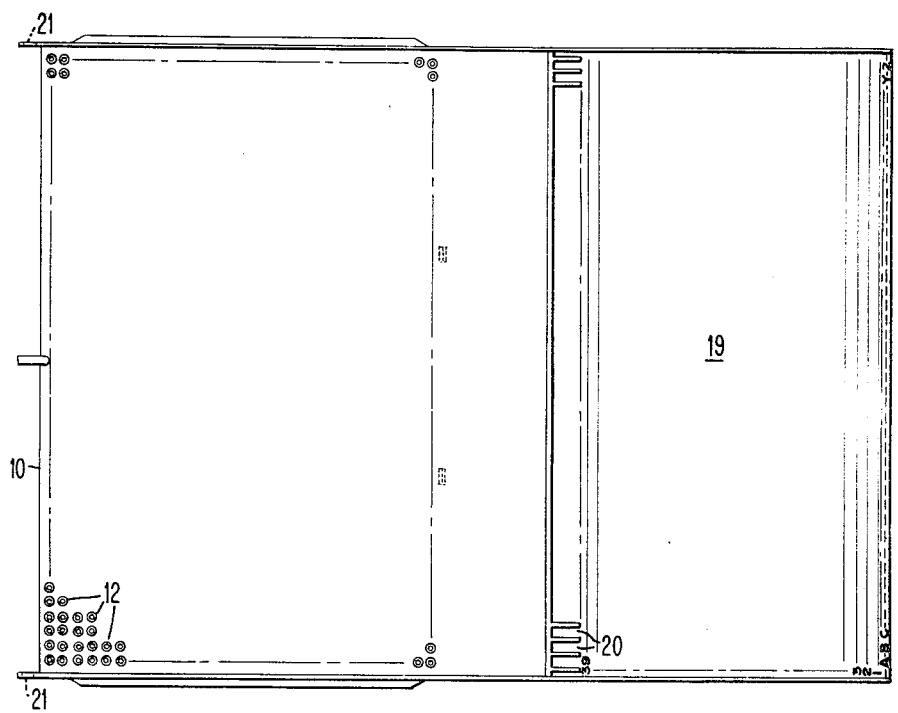
FIG. 3 is a plan view of the test device assembly including one form of template usable with the test device assembly and with the channel guide member removed.
Figure 4:
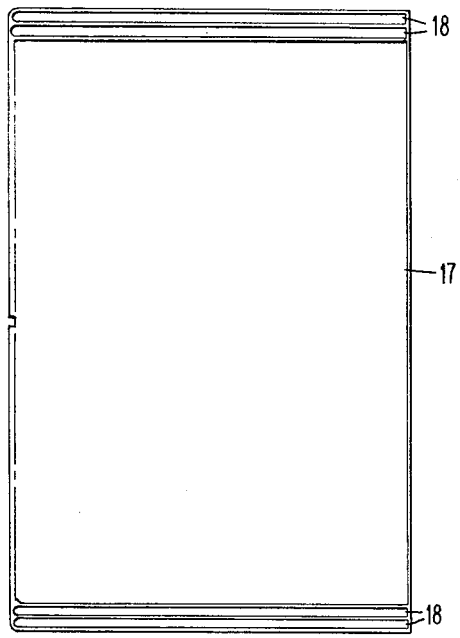
FIG. 4 is a plan view of the channel guide member.

Referring to FIGS. 1, 2 and 3, a test probe adapter according to a preferred embodiment of the invention comprises a template 10 which is a sheet-like member of electrically nonconductive material adapted to overlie the conductive side of a printed circuit panel or card 11. The template 10 may have variously arranged holes 12 in patterns conforming to critical test points on the printed circuit wiring side of the printed circuit card 11 and accessible through the holes 12 with the aid of a contact tip 13. The tip 13 (FIG. 2) is an integral part of a spring arm 14. The spring arm 14 is attached to one end of a probe rod 15. A test device lead 16 (FIG. 1) is attached to the other end of the probe rod 15.

The test adapter further includes a channel guide member 17 also of electrically nonconductive material. The channel guide member 17 has a plurality of equally spaced channels 18 into which a probe rod 15 is slidably and selectively positionable in relationship to the circuit pattern of a printed circuit card 11. The test adapter includes an extended portion 19 to which is attached a plurality of retainer clips 20, a cooperating pair for each channel guide position. Retainer clips 20 function to hold a probe rod 15 in a selected position. The upper surface of the extended portion 19 may include a graphical representation of an indexing pattern to assist and provide visual indication for the selected positioning of the probe rod 15.

The test adapter assembly includes apertures 21 for attachment to a printed circuit card terminal block. More specifically, the terminal blocks into which the printed circuit card is inserted are provided with square protrusions. These protrusions fit into the apertures 21 and function as a holding arrangement for attaching the test adapter to the printed circuit card while in its normal operating position. Templates 10 are interchangeable to accommodate different circuit patterns and/or different printed circuit card configurations.

For operation, the test adapter assembly is attached to the printed circuit card which is to undergo tests with the printed circuit card remaining in its normal operating position within a data processing system. With the test adapter properly in place, the points on the printed circuit card to be tested may be contacted by simply inserting the probe rod 15 into the appropriate guide channel 18 and insertably moving the rod 15 to its proper position. The apertures 12 in the template are made sufficiently small to limit the movement of the contact point 13 through a hole 12 but ample to insure accurate placement of the point 13 and to provide a reliable electrical connection.

While the invention has been particularly shown and described with reference to a preferred embodiment thereof, it will be understood by those skilled in the art that the foregoing and other changes in form and detail may be made therein without departing from the spirit and scope of the invention.

We claim:
1. An adapter for dynamically testing printed circuit cards without electrically disconnecting the card from its normal operating position comprising:
   a. a main frame element including an extender portion and a pair of side members arranged to attach the test adapter to a printed circuit card,
   b. a guide member having a plurality of equally spaced guide elements affixed to the side members and a portion of the guide member overlying the extender portion at one end in a spaced relationship thereby forming a transversely located template holding pocket adapted to receive and hold a template interchangeably,
   c. a template having a plurality of holes therein according to a predetermined configuration conforming to the circuit pattern of a printed circuit card to be tested and adapted for insertion into the template holding pocket,
   d. at least one probe arm having a spring biased connecting element affixed to one end and slidably and selectively positionable within said guide member elements and arranged to make contact with a predetermined circuit of the printed circuit card through a hole in a template and the other end of the probe arm being adapted to receive an electrical lead wire of a test-indicating device, and
   e. retainer clips attached to the extender portion for retaining probe arms in the selected positions.

2. An adapter for dynamically testing printed circuit cards as defined in claim 1 further characterized by indexing means attached to the extender portion to provide visual indication for selectively positioning probe arms.

* * * * *